United States Patent [19]

Sanderson et al.

[11] Patent Number: 5,325,725
[45] Date of Patent: Jul. 5, 1994

[54] WATER COOLED STATOR WINDING LEAK DETECTOR

[75] Inventors: Harold C. Sanderson, Tribes Hill; Donald R. Albright, Scotia, both of N.Y.

[73] Assignee: General Electric Company, Schenectady, N.Y.

[21] Appl. No.: 98,782

[22] Filed: Jul. 29, 1993

[51] Int. Cl.$^5$ .............................................. G01F 3/26
[52] U.S. Cl. .................. 73/861.21; 73/217; 73/223
[58] Field of Search ............... 73/861.21, 217, 223, 73/234, 235, 236

[56] References Cited

U.S. PATENT DOCUMENTS 4,064,750 12/1977 Speece ...................... 73/861.21

Primary Examiner—Herbert Goldstein
Attorney, Agent, or Firm—Nixon & Vanderhye

[57] ABSTRACT

A device for monitoring the leakage of cooling gas into the stator water cooling system is disclosed. The vent from the water cooling reservoir tank is connected to the inlet of a U-shaped passageway and the outlet of the passageway is connected to an atmospheric vent. A liquid is provided in the passageway so as to prevent the passage of cooling gas from the inlet to the outlet without a desired pressure differential. At the specified pressure differential however, gas bubbles from one side of the passageway to the other and is trapped by a measuring cup in one position. When a sufficient quantity of gas is passed under the cup, the buoyancy of the cup becomes positive allowing it to rise to a second position where at least a portion of the gas is discharged. Because the amount of gas discharged can be determined and a number of cycles of operation of the cup can be measured, the flowrate can be precisely measured. Appropriate electronic circuitry processes the electronic indications of cup operation to provide an electronic flowrate indication, an alarm indication should the flowrate exceed a predetermined amount and conditioning for computer storage and processing of flowrate information in preferred embodiments.

10 Claims, 8 Drawing Sheets

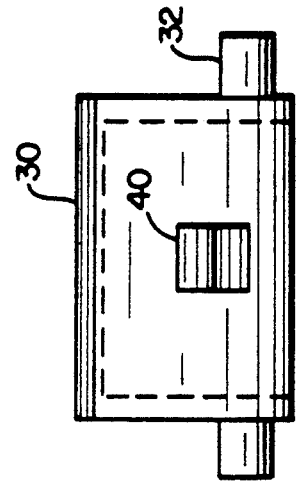
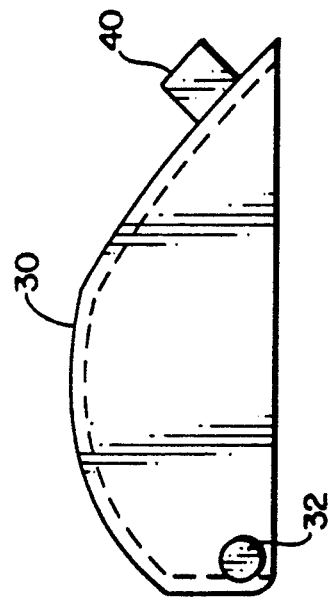

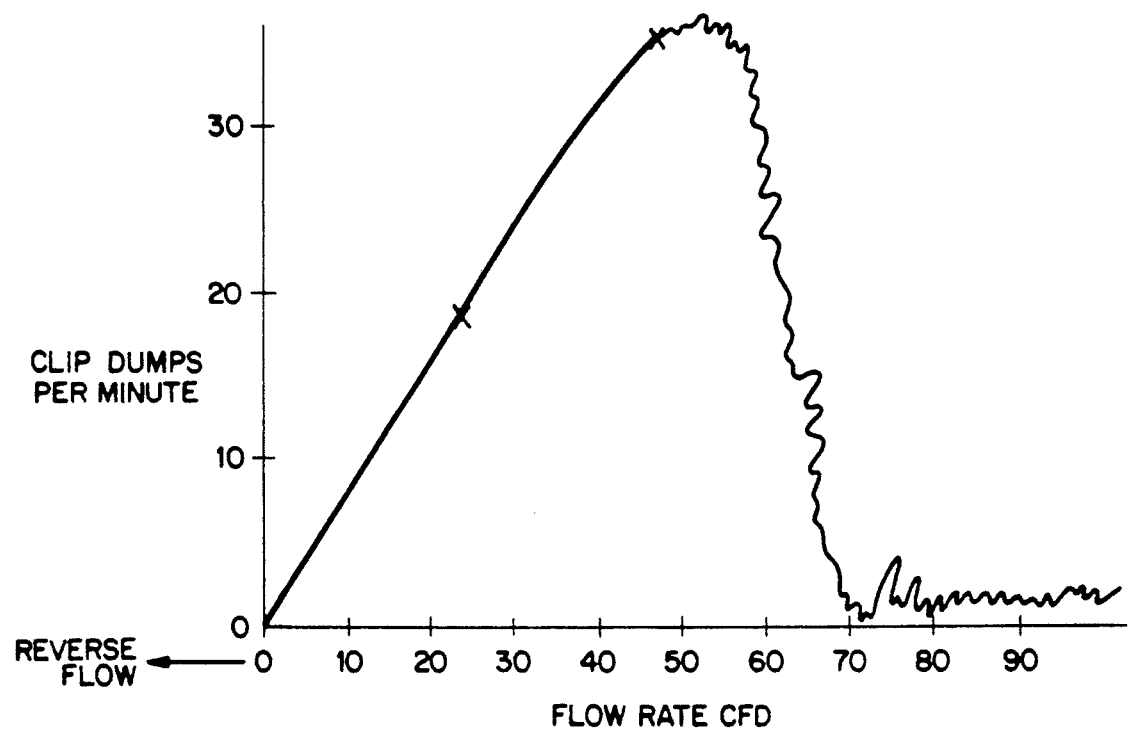

WATER COOLED STATOR WINDING LEAK DETECTOR

TECHNICAL FIELD

The present invention relates generally to the measurement of low flowrate fluid leaks and specifically to the measurement of leaks in liquid-cooled stator windings of commercial electric power generation systems.

BACKGROUND

Commercial electric power generation systems utilize the liquid cooling of stator windings to remove heat generated in the stator windings during power generation. Many systems are designed such that a hydrogen gas coolant in the generator is at a pressure higher than the coolant fluid pressure (generally oil or water). This serves to minimize the leakage of liquid into the generator frame if an opening develops in the cooling system. However, even with the pressure difference, a long split in a cooling hose would probably produce a major liquid leak even though hydrogen gas would probably also flow into the cooling liquid.

This reduced coolant pressure design (also called a "reverse pressure design") provides an early warning of incipient liquid leaks by the monitoring of the presence of hydrogen gas in the coolant liquid. While the coolant liquid can be oil, unless otherwise specified for purpose of clarity, water will be referred to hereinafter as the coolant. An indication of stator winding coolant system leaks have been diagnosed by one or more of the following events:

(1) An observation of high hydrogen gas usage in the generator;

(2) An increase in water conductivity values resulting from ion particles carried into the water system by gas leakage into the same system;

(3) Measurements of the quantity of hydrogen gas leaving the water reservoir tank vent line (normally measured by placing a plastic bag over the exit of the coolant reservoir vent line and monitoring the time to fill the bag with hydrogen);

(4) The observation of liquid in the bottom of the generator (either visually or by float valve actuated switch);

(5) For oil-cooled stator windings, an indication that the normal vacuum of 28" of Hg cannot be maintained and thus a gas leak is overpowering the reservoir tank vacuum pump.

Normal generator operation provides a slight gas flow of around 3-10 cubic feet per day from the coolant reservoir vent line. Of course, it is desirable never to plug the coolant reservoir vent line (to avoid the possibility of explosion) and thus available small orifice flow meter devices would not be appropriate.

Gas flow can reverse under a number of different circumstances. When reduced generator loads are encountered, the temperature of the gas and or coolant liquid will decrease. Reductions in the reservoir gas temperature can establish reservoir pressures less than atmospheric. It is desirable that any flow meter be able to tolerate occasional reverse flows of gas.

Higher than normal gas flows can result during electrical load increases and/or increases in the reservoir gas temperature would provide a higher than normal gas flow rate out of the reservoir tank. Occasional higher flowrates need to be tolerated by any flow meter.

Because the gas hydrogen (in many generator systems) is an explosive gas (when mixed with oxygen), no device capable of producing sparks could be used.

It is desirable to be able to provide a visual indication of the leakage rate especially if the leakage monitor signal suggests a potential problem. It is also desirable to provide a flow measurement signal which can be monitored and is capable of providing a visual and/or audible alarm if the flow rate exceeds the desired levels.

One such device meeting a number of the above requirements is described in U.S. Pat. No. 4,440,017 issued to Barton et al. on Apr. 3, 1984 entitled "Hydrogen Leak Monitor for a Turbine-Generator," the subject matter herein incorporated by reference. This reference provides a detailed description of the water cooling circuit and the monitoring of leak detection based upon venting of gas from the water storage reservoir. It is noted that this device requires a solenoid valve, two float level switches, a bypass valve, a flow reservoir and a relief valve rendering the system relatively complex.

DISCLOSURE OF THE INVENTION

It is an object of the present invention to measure low flowrate gas flows in a simple reliable manner.

It is another object of the present invention to monitor low flowrate gas flows in a system which can be visibly checked for proper operation.

It is a further object of the present invention to provide a low flowrate gas flow detector which can be operated safely in an explosive atmosphere.

It is a further object of the present invention to provide a low rate gas flow detector which can provide a flowrate indication to a flowrate monitoring computer.

The above and other objects are achieved in accordance with the present invention by providing a chamber connected in the liquid reservoir vent line. The chamber includes a pivotally mounted cup below a liquid level position in the chamber. The cup, which is normally in a gas trap position, is capable of pivotal movement to a gas release position. Gas from the reservoir tank is passed to a position under the pivotally mounted cup so that bubbles of gas are trapped under the cup while it remains in the trap position. When a sufficient quantity of gas is trapped under the cup, the buoyancy of the gas overcomes the weight of the cup allowing it to pivot to the gas release position whereupon a volume of the gas is released and the cup returns the gas trap position thus defining one cycle of operation.

The cycles of operation are visually monitored and can be electronically counted and processed to provide gas flowrate. In a preferred embodiment, the actual gas flowrate is compared with an alarm limit and, should the alarm limit be exceeded, visual and/or audible alarms are activated. The gas flowrate can be monitored by a computer or chart recorder for record keeping purposes.

BRIEF DESCRIPTION OF THE DRAWINGS

The invention will be better understood by reference to the following drawings wherein:

FIG. 4A is a side view and FIG. 4B is an end view of the measurement cup in accordance with the present invention;

FIG. 6 is a graph of measurement cup dumps (cycles of operation) per minute versus flowrate in cubic feet per day as measured by one embodiment of the present invention.

BEST MODE FOR CARRYING OUT THE INVENTION

Figure 1:
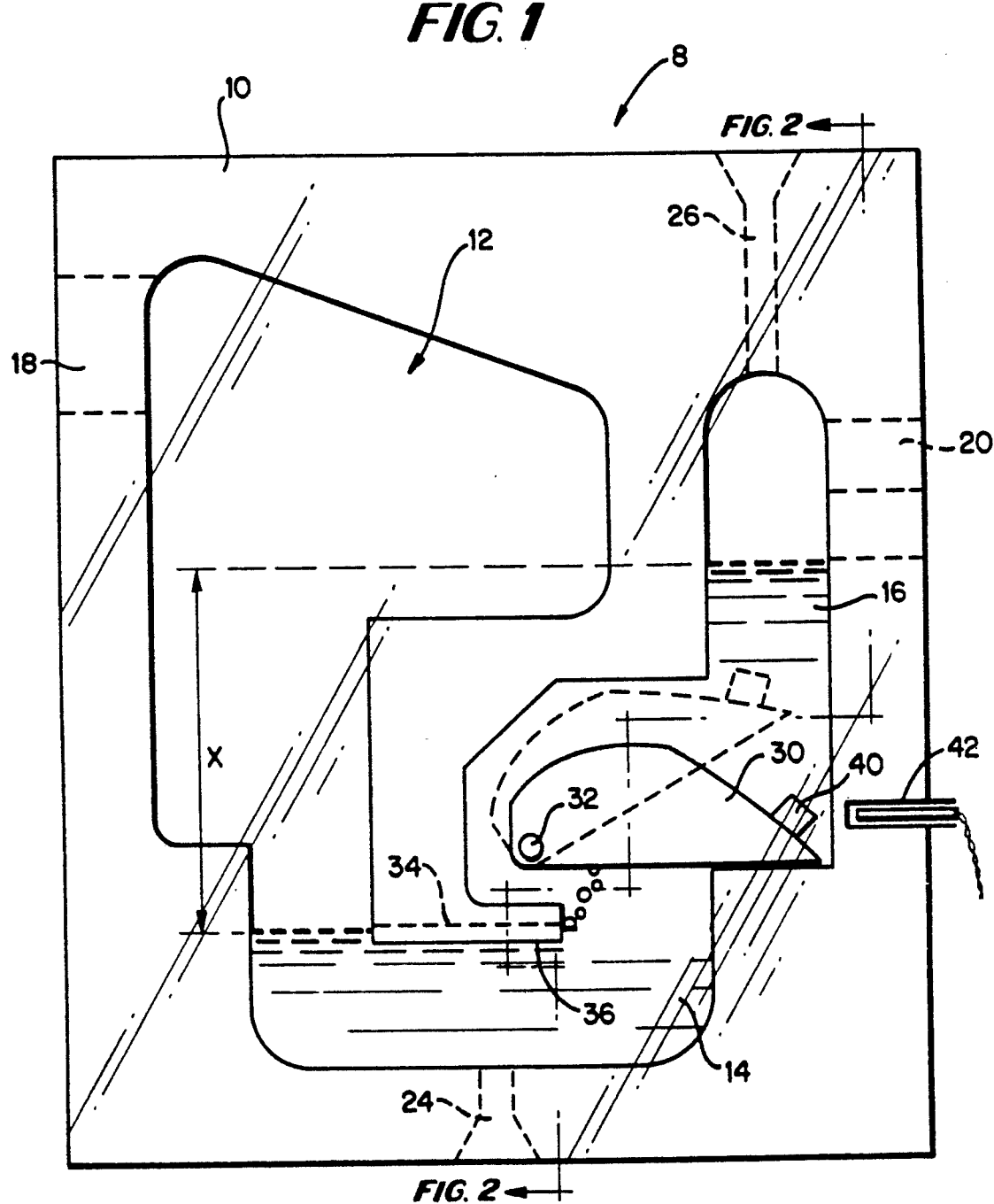
FIG. 1 is a side view of the low flowrate gas flow detector in accordance with the present invention.
Figure 2:
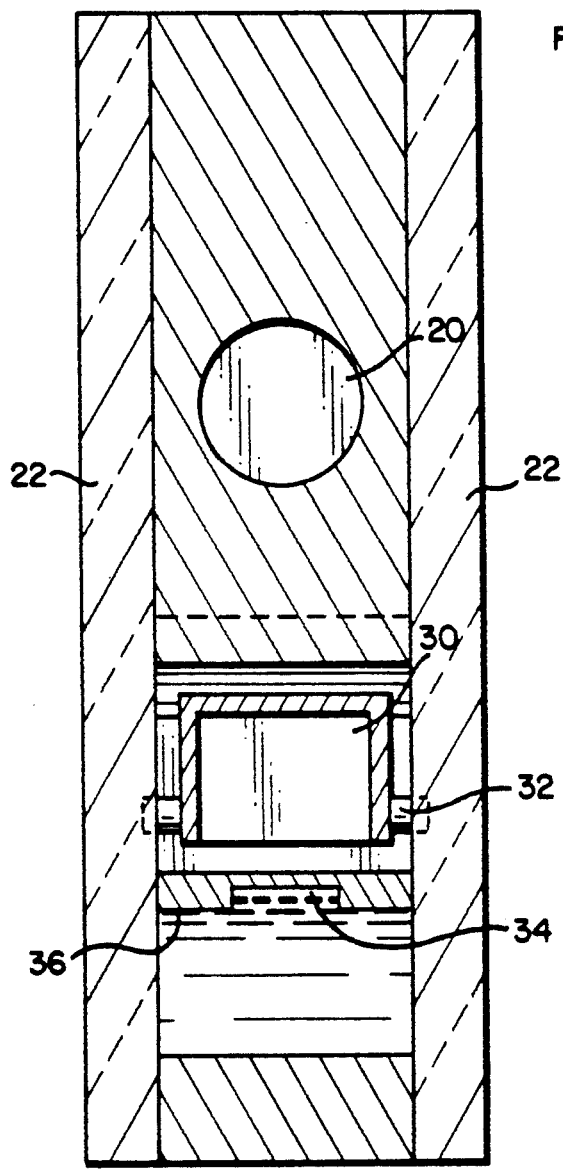
FIG. 2 is an end view of the gas flowrate detector according to FIG. 1.

Similar elements are similarly designated by reference numerals in the individual drawings. For an overall understanding of applicants' invention, attention is first directed to FIG. 1 wherein the low flowrate gas flow detector 8 includes body 10, which in a preferred embodiment is 1¾" stainless steel. Chamber 12 in a preferred embodiment includes a generally U-shaped passageway 14 which is partially filled with liquid 16.

Figure 3:
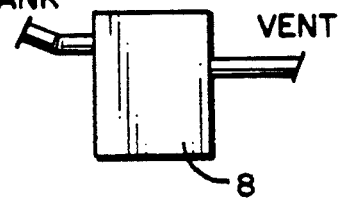
FIG. 3 is an operational view showing the installation of a gas flowrate detector in a coolant reservoir tank vent line.

A gas flow inlet 18 is connected as shown in FIG. 3 to the reservoir vent line such that any gas in the cooling liquid reservoir is vented through the gas flow detector. A gas flow outlet 20 is connected to a conventional vent for such cooling gases. The body 10 is sealingly sandwiched between two planar layers 22, which in a preferred embodiment is an acrylic plastic or polycarbonate plastic material. In a preferred embodiment, a series of ⅜" bolts and nuts secure the planar layers 22 to the body. Provided in the body are a drain port 24 and a filler port 26 which allows the volume of liquid 16 to be adjusted if necessary.

Pivotally mounted within the U-shaped passageway 14 is a measurement cup means comprising measurement cup 30 which, in a preferred embodiment, is mounted upside down on a stainless steel pivot 32 carried by the planar layers. The cup can pivotally move between a gas trap position as shown in FIG. 1 in solid line and a gas release position as shown in dotted line. The groove 34 along the upper surface 36 of the lowermost portion of the U-shaped passageway 14 comprises a means for guiding gas flow into a position immediately under the cup when it is in the gas trap position so that gas accumulates in the cup.

The pivot mounting and the size and shape of the portion of the chamber 12 containing the cup and the buoyancy of the cup itself combine to provide a means for pivotally mounting the cup to have a negative buoyancy in the water and for movement between the gas trap and gas release positions during an operating cycle. As can be seen when sufficient gas is gathered under the cup, the combined buoyancy of the cup and gas (and any springs or counterweights not shown) will cause the cup to rotate to the gas release position whereby a predetermined quantity of gas will be released from the cup to travel out vent 20. This release of gas causes the cup to sink back to the gas trap position as shown in solid line in FIG. 1.

Mounted in association with the cup is a means for counting the number of operating cycles of said cup per unit time. In a preferred embodiment, this counting means is a combination of magnet 40 and reed switch 42 and any desired counting circuitry. The reed switch 42, as shown, provides one electrical indication when in proximity to the magnet (in the preferred embodiment when the cup is in the gas trap position) and another electrical indication when the magnet is away from the switch. Although the magnet/reed switch system is a preferred embodiment, it can be seen that the use of transparent planar layers 22 would permit optical as well as other counting means.

In a preferred embodiment, the portion of chamber 12 between the lowest portion of the U-shaped passageway 14 and the inlet 18 is sized such that a reverse flow of gas will not allow liquid 16 to spill into the reservoir tank through inlet 18. It can be seen that, with the same pressure in inlet 18 and outlet 20, the water level in each of the chambers would be equal. It can also be seen that the gas pressure at inlet 18, which will result in leakage of gas along groove 34, is equal to the pressure which will create a liquid level difference equal to distance X. Where water is used as liquid 16, in a preferred embodiment, the distance X is approximately 3". Thus, the gas pressure in inlet 18 must reach 3" of water before gas will begin venting along groove 34 and accumulating in cup 30.

The pressure at which venting occurs is adjusted by either draining water from the device via drain port 24 or adding water to the device by filler port 26. It can be seen that, if outlet 20 is connected to the atmosphere, a less than atmospheric pressure at inlet 18 will cause the liquid level in the left side of U-shaped passageway 14 to rise and the liquid level on the right side to fall. The cup will stay in its "gas trap position" and obviously no gas wi 11 pass.

Clearly if a sufficient negative pressure (relative to atmospheric) is created in inlet 18, the liquid level on the right side of U-shaped passageway 14 will decrease to the level of groove 34 at which point bubbles of atmospheric air will pass through the liquid toward inlet 18. If it is desirable for a much greater negative pressure to be tolerated in the coolant reservoir tank (perhaps to avoid the addition of atmospheric oxygen to the hydrogen gas in the tank), the left side of U-shaped passageway would have a small cross section but rise to a much greater height such that a much larger column of water would be supported before atmospheric gas began leaking from the gas flow outlet to the gas flow inlet. It is desirable to size the portion of the chamber 12 which is immediately adjacent inlet 18 sufficiently large so as to accommodate a maximum amount of liquid which would be used in the device so as to avoid the liquid level rising far enough to be pulled into inlet 18.

FIGS. 4A and 4B are side and end views of a preferred embodiment of the cup. Preferred materials include polycarbonate plastic material, plastics made of Norell or other plastics such as "Valox 9230" (available from General Electric). While in a preferred embodiment, the shape of the cup is such that, in the gas release position, all gas previously trapped in the cup is discharged towards the outlet 20, a cup design which retains a portion of the gas would work equally well. During calibration, the amount of gas flow which actually escapes from the cup during one operating cycle would be utilized to compute flowrate rather than the total amount of gas capable of being trapped by the cup as in the present embodiment.

FIG. 6 illustrates the linearity of the low flowrate gas flow detector for flowrates between 0 and 50 cubic feet per day which is the range of interest for monitoring hydrogen gas flow from coolant water reservoirs. On the vertical axis of the graph are listed cup dumps per minute (cycles of operation per minute) where a single cycle of operation is the cup moving from its gas trap position to the gas release position where the predetermined quantity of gas is released and then returning to the gas trap position.

The number of cup dumps per minute rises linearly with respect to the flowrate in cubic feet per day up to approximately 50 cubic feet per day at which point the output becomes inaccurate. This inaccuracy is caused by a gas flowrate large enough such that all gas is not funneled by groove 34 to the cup and some gas escapes around the sides of the cup and therefore avoids detection. Also, gas leaks out of the cup during opening and closing portion of the cycle producing a deviation from the linear curve. As the flowrate increases further, the cup does not have sufficient time to return to its closed position before it has trapped enough gas to cause another cycle and, thus, the magnet 40 may not pass sufficiently close to reed switch 42 to provide the desired electrical indication. In the event the flowrate increases further, the passage of gas into the cup is sufficient to maintain it in an open position such that it rarely, if at all, closes enough for magnet 40 to trigger the magnetic reed switch 42. However, within its designed flowrate of from 0-50 cubic feet per day, it can be seen that the counting of the operating cycles of the cup per minute provides an accurate indication of flowrate.

Figure 5A:
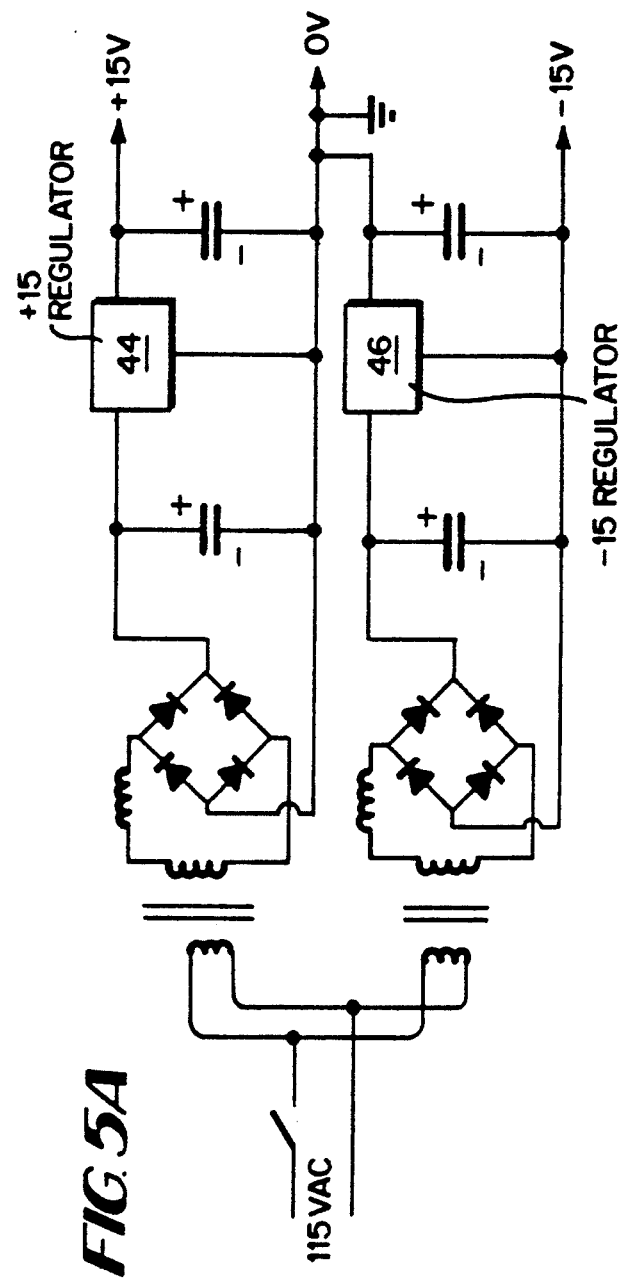
FIG. 5A is an electronic circuit diagram of a regulated direct current voltage supply in accordance with one embodiment of the present invention.
Figure 5C:
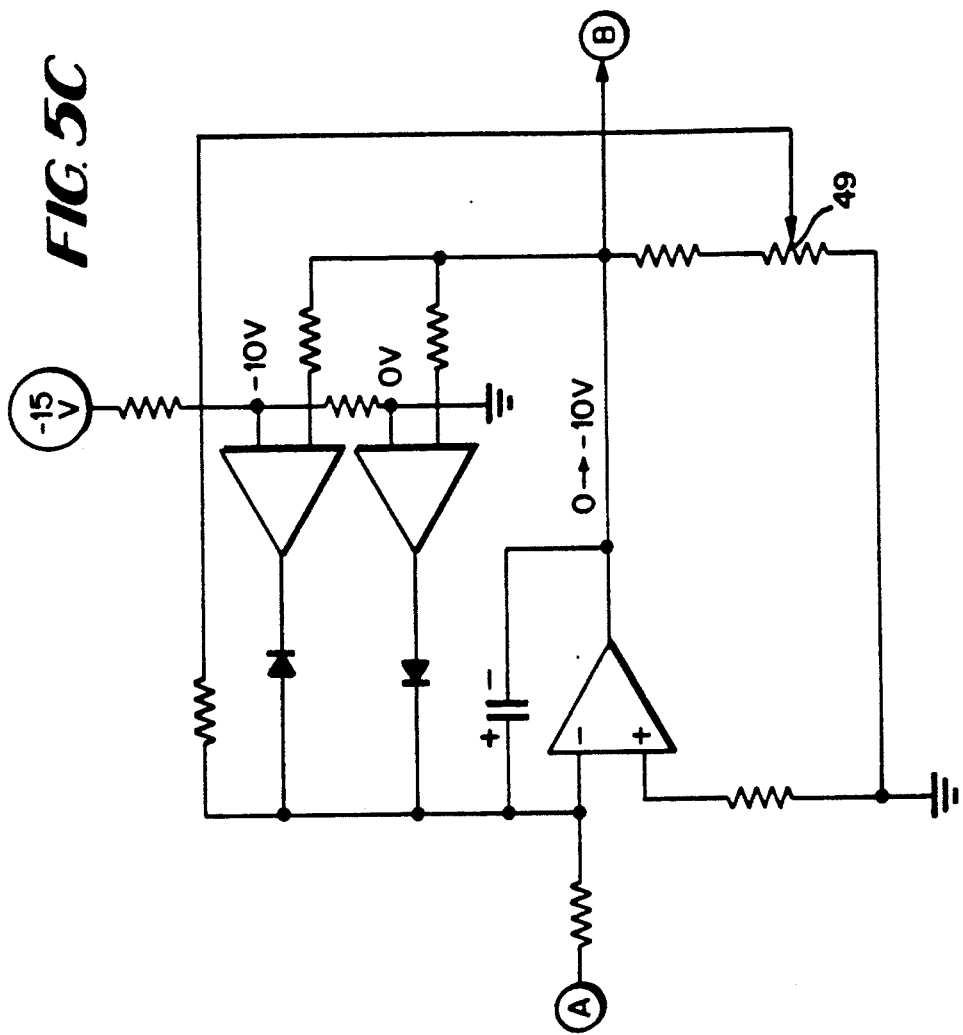
FIG. 5C is an electronic circuit diagram of an integrator and low pass filter for providing a flowrate output based upon measurement cup inputs in accordance with one embodiment of the present invention.
Figure 5B:
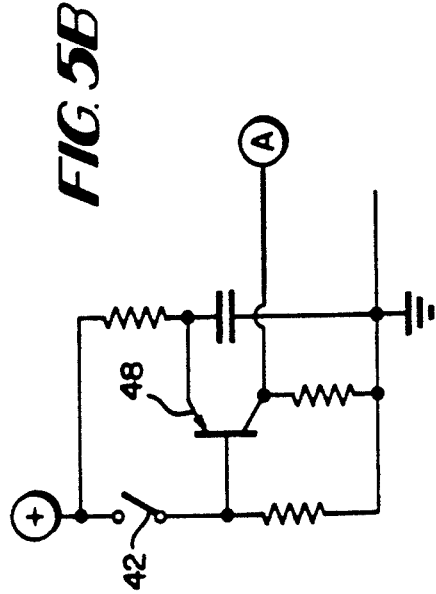
FIG. 5B is an electronic circuit diagram of a signal conditioning circuit for providing an output signal indicative of the measurement cup position in accordance with one embodiment of the present invention.

The mechanism for monitoring and/or recording the flowrate is disclosed in FIGS. 5A-5E. 5A illustrates a full wave bridge rectifier with filter and positive and negative voltage regulators, 44 and 46, respectively, for providing regulated positive and negative 15 volt DC supply power. Such circuits are conventional and well known to those of ordinary skill in the art. FIG. 5B illustrates a typical circuit for providing an electrical output at A indicative of the operation or condition of magnet reed switch 42. In this embodiment, when the reed switch is closed, the transistor 48 is biased into conduction thereby causing a voltage drop across the resistor and providing a voltage output at A. As will be known to those of ordinary skill in the art, numerous other electronic circuits for conditioning the output of the magnetic reed switch 42 could be provided. Depending upon the location of the magnetic reed switch and/or the location of the magnet on the cup, the reed switch could provide an indication of the cup being in the gas trap position, being in the gas release position or being in an intermediate position, although the latter would result in two reed switch outputs per cycle of operation.

FIG. 5C is an integrator and low pass filter circuit for conditioning the output A of the FIG. 5B circuit. The input to the integrator is at A and the output B is clamped to between 0 and −10 volts. The output B will gradually bleed to 0 if no additional inputs are provided with the bleed or reset rate being adjustable by means of potentiometer 49. However with a periodic input at A, a voltage between 0 and −10 volts is provided at the integrator output B which output is an electrical indication of the existing flowrate.

Figure 5D:
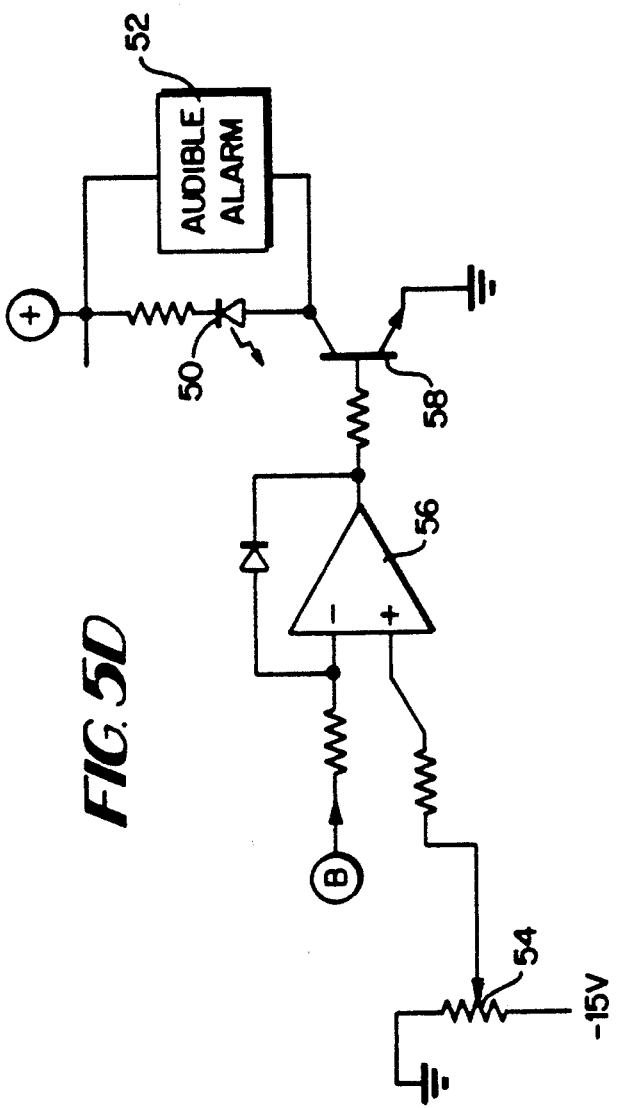
FIG. 5D is an electronic circuit diagram of a circuit for comparing a flowrate output of FIG. 5C with a preset alarm limit and for activating a visual and/or audible alarm in accordance with one embodiment of the present invention.

FIG. 5D is an alarm circuit in which an alarm level is set by a potentiometer 54 and this alarm limit is compared with the integrator output B. When the integrator output B exceeds the alarm threshold limit as determined in the comparator 56, the output transistor 58 is biased into conduction providing a visual indication from light emitting diode 50 and/or activation of audible alarm 52.

Because there are some circumstances in which high flowrates will be expected in the gas detector (when filling the water reservoir, during transition from low load to high load, etc.), it is desirable to be able to monitor the gas flowrate with a computer which can be programmed to react to those special conditions and not provide flowrate alarms unnecessarily.

Figure 5E:
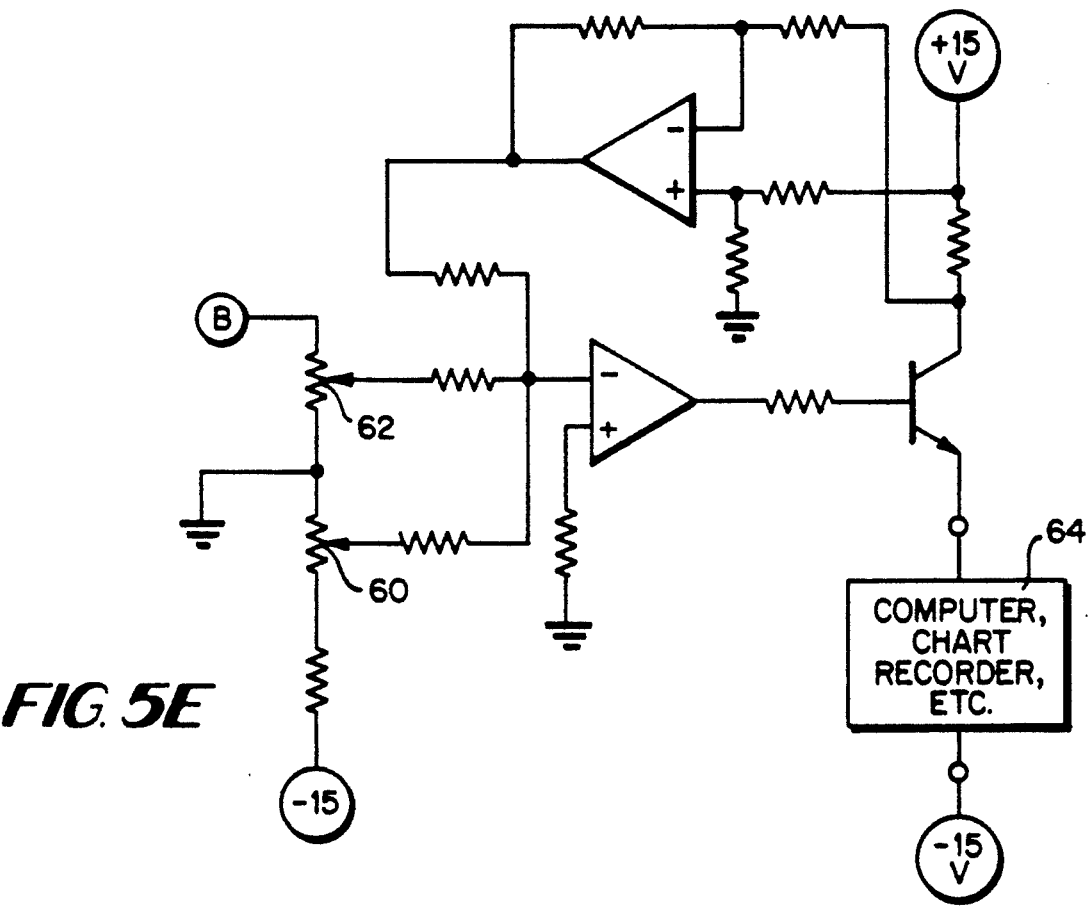
FIG. 5E is an electronic circuit diagram of a 4-20 milliamp driver circuit for providing a conditioned flowrate output to a computer, chart recorder, etc.

FIG. 5E is a signal conditioning circuit which is a conventional 4-20 milliamp load signal conditioning circuit utilizing the output B from the FIG. 5C integrator. The signal conditioning circuit provides zero adjustment potentiometer 60 and span adjustment potentiometer 62 for providing flowrate information in a manner compatible with the desired load 64, i.e., computer, chart recorder or other recordation system. In a preferred embodiment, the computer, as noted above, can be programmed with an appropriate algorithm to account for those factors which would produce higher than expected gas flow rates and thereby eliminate or at least substantially reduce the instance of false alarms.

In view of the above, numerous variations and modifications of the present invention will be obvious to those of ordinary skill in the art. Depending upon the specific flowrate to be measured, the size and volume of the measurement cup can be adjusted. The materials utilized to form the body and the planar layers can also be chosen to be unaffected by corrosive liquids and/or gases and can be transparent if so desired to permit optical measurement or an optical backup to an electronic measurement. The sizes of the U-shaped passageway 14 and chamber 12 will be chosen so as to preclude passage of liquid 16 into the inlet thereby possibly contaminating the coolant storage reservoir and, at the same time tolerate the desired forward and reverse gas pressures.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A low flowrate gas flow detector for measuring gas flow through a vent line, said detector comprising:
 a gas flow inlet connected to an upstream end of said vent line;
 a gas flow outlet connected to a downstream end of said vent line;
 a chamber, connected between said gas flow inlet and said gas flow outlet, including a water trap;

measurement cup means, located in said chamber and said water trap, for moving through one operating cycle under the influence of a predetermined quantity of gas flow;

means for pivotally mounting said cup means to have a negative buoyancy in water and for movement between a gas trap position and a gas release position where said gas trap position traps a sufficient quantity of gas under said cup means to provide a positive buoyancy to said cup means and said release position releases said predetermined quantity of gas;

means for guiding gas from said inlet to a position under said cup means in said gas trap position; and means for counting the number of cycles of said cup means per unit of time, said flow rate equal to the number of cycles per unit time multiplied by said predetermined quantity of gas trapped and released by said cup means during one cycle.

2. The low rate gas flow detector according to claim 1, wherein said chamber includes a U-shaped passage connecting said gas flow inlet with said gas flow outlet, said water trap comprised of a quantity of water in said U-shaped passage partially blocking passage of gas from said gas flow inlet to said gas flow outlet.

3. The low rate gas flow detector according to claim 2, wherein an inlet gas pressure in the range of 1–5 inches of water is necessary to depress the water level in said U-shaped passage connected to said gas flow inlet a sufficient distance such that said means for guiding gas provides gas to said measurement cup means.

4. The low rate gas flow detector according to claim 1, wherein said measurement cup means is negatively buoyant when filled with water.

5. The low rate gas flow detector according to claim 1, wherein said sufficient quantity of gas has the same volume as said predetermined quantity of gas.

6. The low rate gas flow detector according to claim 1, wherein said means for counting comprises:
means for detecting proximity of said measuring cup means during at least one portion of said operating cycle; and summing means, responsive to said proximity detecting means, for providing an electrical output indicative of the number of operating cycles per unit time.

7. The low rate gas flow detector according to claim 6, wherein said proximity detecting means comprises:
a magnet located on said cup means; and
a reed switch means, fixed with respect to said cup means and responsive to said magnet passing near said reed switch means during an operating cycle, for providing an electrical indication of passage of said magnet near said reed switch means.

8. The low rate gas flow detector according to claim 7, wherein said summing means comprises a means for integrating the electrical indication of passage form said reed switch means and providing an electrical output indicative of gas flowrate.

9. The low rate gas flow detector according to claim 1, wherein said detector includes an alarm means, responsive to said summing means output being greater than an alarm limit, for providing at least one of a visual and audible leakage alarm.

10. A method of measuring low flowrate gas flow through a vent line, said method comprising the steps of:
directing said gas flow through a water trap in a chamber and under a pivotally mounted measurement cup, located in said chamber and said water trap, such that said measurement cup, under the influence of said gas flow, moves through an operating cycle including movement from a gas trap position to a gas release position and return to said gas trap position, where said gas trap position traps a sufficient quantity of gas under said cup to provide a positive buoyancy to said cup and moving said cup to said release position, and said release position releases said predetermined quantity of gas allowing said cup to return to said gas trap position;
counting the number of cycles of said cup means per unit of time, said flow rate equal to the number of cycles per unit time multiplied by said predetermined quantity of gas trapped and released by said cup means during one cycle.

* * * * *